United States Patent
Jing et al.

(10) Patent No.: US 12,174,634 B2
(45) Date of Patent: Dec. 24, 2024

(54) OPTIMAL PATH LIBRARY FOR LOCAL PATH PLANNING OF AN AUTONOMOUS VEHICLE

(71) Applicant: TUSIMPLE, INC., San Diego, CA (US)

(72) Inventors: Junbo Jing, San Diego, CA (US); Arda Kurt, San Diego, CA (US); Tianqu Shao, San Diego, CA (US); Chasen Sherman, San Diego, CA (US); Xing Sun, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/186,137

(22) Filed: Mar. 17, 2023

(65) Prior Publication Data
US 2023/0244237 A1 Aug. 3, 2023

Related U.S. Application Data

(62) Division of application No. 16/826,117, filed on Mar. 20, 2020, now Pat. No. 11,619,943.

(51) Int. Cl.
*G05D 1/00* (2024.01)
*B62D 15/02* (2006.01)

(52) U.S. Cl.
CPC ......... *G05D 1/0212* (2013.01); *B62D 15/021* (2013.01); *B62D 15/025* (2013.01); *G05D 1/0274* (2013.01); *G05D 1/0276* (2013.01)

(58) Field of Classification Search
CPC ... G05D 2201/0212; G05D 2201/0213; G06Q 10/047; B60W 60/0015
See application file for complete search history.

(56) References Cited

U.S. PATENT DOCUMENTS

| | | |
|---|---|---|
| 9,405,293 B2 | 8/2016 | Meuleau |
| 10,946,519 B1 | 3/2021 | Prats |
| 10,948,919 B2 | 3/2021 | Zhu et al. |

(Continued)

FOREIGN PATENT DOCUMENTS

JP   2020038631 A   3/2020

OTHER PUBLICATIONS

Wonteak Lim, Hierarchical trajectory planning of an autonomous car based on the integration of a sampling and an optimization method., 2018, IEEE Transactions on Intelligent Transportation Systems, Final, Entire Document (Year: 2018).
United States Patent & Trademark Office, Non-Final Office Action for U.S. Appl. No. 16/826,117, Mailing Date: Jan. 10, 2022, 19 pages.
United States Patent & Trademark Office, Non-Final Office Action for U.S. Appl. No. 16/826,117, Mailing Date: Jul. 5, 2022, 19 pages.

(Continued)

*Primary Examiner* — Jaime Figueroa
*Assistant Examiner* — Jerrod Irvin Davis
(74) *Attorney, Agent, or Firm* — Perkins Coie LLP

(57) ABSTRACT

Methods, systems and apparatus for autonomous vehicle path planning and path navigation are described. One example system includes an offline server configured to generate a library of optimal paths for navigating a geographic area, wherein the geographic area is represented as a grid node map and an orientation grid bin map and wherein the optimal paths correspond to paths between pairs of grid node pairs in the grid node map based on optimization criteria, a storage device on the autonomous vehicle for storing the library of optimal paths, and an online server located on the autonomous vehicle configured to access information from the library of optimal paths from the storage device based on a current position and a current heading of the autonomous vehicle, and navigating the autonomous vehicle through the geographic area based on the information.

20 Claims, 12 Drawing Sheets

(56) References Cited

U.S. PATENT DOCUMENTS

| | | | |
|---|---|---|---|
| 2017/0228325 A1 | 8/2017 | Wilcock | |
| 2018/0188040 A1 | 7/2018 | Chen et al. | |
| 2019/0016382 A1 | 1/2019 | Zarep | |
| 2019/0235512 A1* | 8/2019 | Sinyavskiy | G05D 1/0217 |
| 2019/0299984 A1 | 10/2019 | Shalev-Shwartz et al. | |
| 2020/0225669 A1 | 7/2020 | Silva et al. | |
| 2020/0363800 A1 | 11/2020 | Jojo-Verge et al. | |
| 2020/0363801 A1 | 11/2020 | He et al. | |
| 2020/0386557 A1* | 12/2020 | Hansson | G06V 20/588 |
| 2021/0003404 A1* | 1/2021 | Zeng | G01C 21/32 |
| 2021/0229509 A1 | 7/2021 | Raeis Hosseiny et al. | |
| 2021/0029433 A1 | 9/2021 | Jing et al. | |
| 2021/0341309 A1* | 11/2021 | Yuan | G01C 21/3461 |

OTHER PUBLICATIONS

United States Patent & Trademark Office, Notice of Allowance for U.S. Appl. No. 16/826,117, Mailing Date: Dec. 7, 2022, 10 pages.
U.S. Patent & Trademark Office, Final Office Action for U.S. Appl. No. 16/912,444, mailed on Apr. 14, 2023, 31 pages.
U.S. Patent & Trademark Office, Advisory Action for U.S. Appl. No. 16/912,444, mailed on Aug. 10, 2023, 3 pages.
U.S. Patent & Trademark Office, Non-Final Office Action for U.S. Appl. No. 16/912,444, mailed on Sep. 13, 2023, 35 pages.
U.S. Patent & Trademark Office, Final Office Action for U.S. Appl. No. 16/912,444, mailed on Mar. 1, 2024, 38 pages.
Dariani et al., "Optimal Control Based Approach for Autonomous Driving," 2016 IEEE 21st International Conference on Emerging Technologies and Factory Automation (ETFA), Sep. 1, 2016, 8 pages.

* cited by examiner

OPTIMAL PATH LIBRARY FOR LOCAL PATH PLANNING OF AN AUTONOMOUS VEHICLE

CROSS-REFERENCE TO RELATED APPLICATIONS

This document is a divisional of U.S. patent application Ser. No. 16/826,117, filed on Mar. 20, 2020. The aforementioned application is incorporated by reference herein in its entirety.

TECHNICAL FIELD

This document relates to autonomous driving.

BACKGROUND

Autonomous driving uses sensors and processing systems that observe the environment surrounding the autonomous vehicle and make decisions that ensure the safety of the autonomous vehicle and surrounding vehicles. The sensors should accurately determine distances to, and velocities of, potentially interfering vehicles as well as other movable and immovable objects. New techniques are needed to determine the path an autonomous vehicle should take in environments such as parking lots and narrow roads.

SUMMARY

Various techniques are described for generating optimal path library that can be used by autonomous vehicle embodiments for navigating the autonomous vehicle, especially through turn areas that are difficult to maneuver.

In one example aspect, a method of navigating an autonomous vehicle includes determining, by an online server located on an autonomous vehicle, a current driving information including a current position of the autonomous vehicle, using the current driving information to determine an optimal path for navigating the autonomous vehicle to a next position based on paths from a pre-stored path library, and navigating the autonomous vehicle towards the next position based on the optimal path.

In another example aspect, a method of generating a library of optimal paths for an autonomous vehicle is disclosed. The method includes, discretizing, by an offline server, a position space into a grid node map defined by lateral and longitudinal location nodes along a reference driving line on a driving map, discretizing, by the offline server, an orientation space of each grid node in the grid node map into a grid bin array that defines a heading angle resolution of a driving trajectory, performing, by the offline server, an exhaustive search for an optimal vehicle driving trajectory for the discretized position space, wherein the exhaustive search includes vehicle state vectors, wherein the exhaustive search includes evaluating driving trajectory connections between every two pairs of state space and grid nodes on two layers along a reference driving direction in the driving space to determine a best driving action leading to global optimal complete trajectories, and determining, by the offline server based on an evaluation, optimal paths for storage in the library of optimal paths.

In yet another example aspect, another method of generating a library of optimal paths for an autonomous driving vehicle is disclosed. The method includes receiving, at an offline server, a tractor terminal location and a tractor terminal orientation information, determining, at the offline server, a state space node grid map for optimal path library searching based on a state space resolution requirement, determining, at the offline server, path arcs between an evaluated state space node and reachable state space nodes in an adjacent upper layer grid map, determining, at the offline server, from a path arc from the path arcs, at least a path arc length, a path arc curvature, and a heading angle value of the upper layer grid node, determining, at the offline server, a kinematic response by the autonomous driving vehicle to the path arc, determining, at the offline server, from the kinematic response, a tractor vehicle steering angle and coordinates for one or more body locations of the autonomous driving vehicle along the path arc, determining, at the offline server, an overall performance metric representative of the path arc by applying performance metrics to the path arc, the steering controller steering angle, the kinematic response, and the one or more body locations along the path arc, and determining, at the offline server, a validity of the path arc based on the overall performance metric and removing path arcs that are determined to be invalid.

In another example aspect, a system for navigating an autonomous vehicle is disclosed. The system includes an offline server configured to generate a library of optimal paths for navigating a geographic area, wherein the geographic area is represented as a grid node map and an orientation grid bin map and wherein the optimal paths correspond to paths between pairs of grid node pairs in the grid node map based on optimization criteria, a storage device on the autonomous vehicle for storing the library of optimal paths, and an online server located on the autonomous vehicle configured to access information from the library of optimal paths from the storage device based on a current position and a current heading of the autonomous vehicle, and navigating the autonomous vehicle through the geographic area based on the information.

In yet another example aspect, a hardware platform for implementing an online server or an offline server that performs the above described methods is disclosed.

These, and other, aspects are further described in the present document.

DETAILED DESCRIPTION

Figure 1:
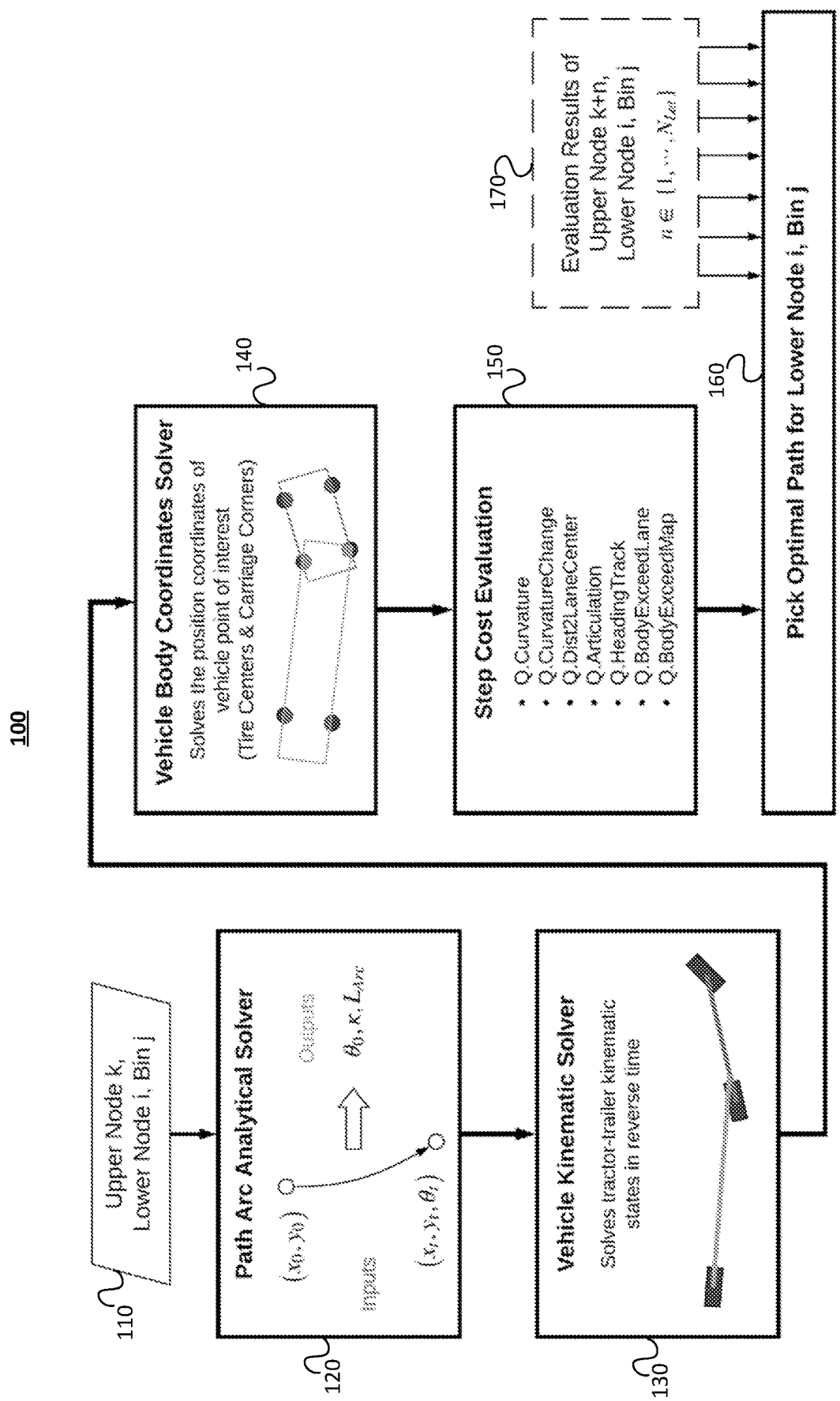
FIG. 1 depicts an example of a process for offline path search and evaluation, in accordance with some example embodiments.

In the present document, while some embodiments are described with reference to tractor-trailers, the disclosed techniques may be applied to other autonomous vehicles.

The disclosed subject matter is related to autonomous driving including path planning for a tractor-trailer in a restricted geographical space. In a first part, an offline process is used for generating a compact library of optimal driving paths for a pre-mapped driving area that can be stored in the autonomous vehicle. In a second part, the optimal path library can be read online to generate vehicle driving path trajectories specific for vehicle locations and orientations that are updated in real time. For example, an "offline process" may be a computing process performed using resources external to the autonomous vehicle, and an "online process" may be a computing process performed using computing resources internal to the autonomous vehicle.

In some example embodiments, the disclosed subject matter may be used for navigating a tractor-trailer vehicle through a geographical space that is challenging to maneuver the vehicle given the vehicle's size and geometry. For example, challenging spaces include a narrow street, a parking area, a docking area, a sharp intersection, and so on. Some scenarios are also referred to as "local wide turns" for a tractor-trailer truck.

Path planning in the scenarios described above for tractor-trailers is challenging because a tractor-trailer is articulated which makes path planning exhibit a high order and a high nonlinearity. The complicated shape of realistic city driving makes the search space highly non-convex. The disclosed subject matter transfers the optimization search problem from the autonomous vehicle to an offline server that provides compact search results to the vehicle's online computer. A global optimal exhaustive search is possible due to the use of offline computing resources that may be significantly more powerful and may work on a larger time budget than the available online computing resources.

Some embodiments use a solution that discretizes a driving or position space into a grid node map defined by lateral and longitudinal location nodes along a reference driving line on a driving map. The solution further discretizes the orientation space of each grid node into a grid bin array that defines the heading angle resolution of a driving trajectory. A grid node defines one deterministic location coordinate set before the search starts, and a grid bin defines a memory space for a range of orientation angles of which a specific value will be determined dynamically while the search proceeds. The location grid node map and orientation grid bin map together may be referred to as a state space grid map. Each state vector is defined by three elements of vehicle location including a vehicle x-coordinate value, a vehicle location y-coordinate value, and a vehicle heading angle value.

Some embodiments perform an exhaustive search offline for an optimal vehicle driving trajectory for the predefined and discretized driving space. The search includes all feasible sets of vehicle location and orientation combinations in the state space grid map. The search is performed offline from the autonomous vehicle, and every possible driving state situation in the discretized state space can be pre-evaluated in preparation for an autonomous driving path. Computation memory management uses Bellman's optimality principle by performing the search in a backward direction from the desired terminal state (location and orientation) and only keeps the cumulative optimal solution. As such, the total memory usage is finite and reasonable in scale. The desired terminal state defines one margin of the searchable space of the map area.

The search process evaluates the driving trajectory connections between every two pairs of state space grid nodes on two layers along the reference driving direction of the map space to determine the best driving step action leading to global optimal complete trajectories. The evaluation starts by constructing a trajectory arc between the two grid nodes following the vehicle kinematic model, tracing from the trajectory heading angle of the optimal trace stored in the lower layer grid node's evaluated grid bin. Trajectory heading angle values stored in the upper layer grid nodes' grid bins are determined dynamically as the search proceeds. Action and state costs related to vehicle kinematics can be assigned to evaluate the motion smoothness and reference driving trajectory tracking accuracy performance.

Search evaluation at each step further proceeds by expanding the vehicle kinematic trace defined by a bicycle model between every two feasible grid nodes into traces specific to tractor-trailer vehicles that factors in trailer motion states, and into traces of vehicle body corners and vehicle tires that may relate to motion control when driving in a confined space. Action and state costs related to vehicle detailed position information can be assigned to evaluate driving space usage and collision avoidance performance.

After costs are assigned for all of the trajectory connections to a layer of grid nodes, the method keeps only the optimal trajectory connections to every reachable pair of grid node and grid bin and deactivates the pairs of grid nodes and grid bins for the next layer's search evaluation if certain criteria are violated. The optimal trajectory connections' linkage information in regard to the related two layers of grid nodes is then saved to formulate the optimal path library.

The search process may repeat the foregoing evaluating the driving trajectory connections, the expanding the vehicle kinematic trace, and the keeping only the optimal trajectory connections to every reachable pair of grid nodes for each unevaluated layer of grid nodes, until reaching the other margin of the interested area on the map which corresponds to the foregoing margin of the searchable space of the map area.

When using the optimal path library online, as the autonomous vehicle approaches a mapped turn area, the method uses the vehicle's current x and y coordinates reported from a localization method to find the nearest grid node on the discretized state space of the optimal path library, and then uses the vehicle's current heading angle value reported from a yaw angle measurement device to find the nearest orientation grid bin of the nearest location grid node. The optimal trajectory linkage information can then be retrieved and expanded autonomously.

The optimal trajectory linkage information indicates the optimal connection grid node and grid bin of the next layer, and the path compact analytical solution in between the connection defined by vehicle kinematics, to reconstruct the continuous vehicle driving trajectory in physical space.

As each pair of grid node and grid bin is assigned with the optimal trajectory linkage information to the next layer, the entire optimal driving trajectory expands consecutively and autonomously starting from the initial pair indicating the vehicle's current location and orientation, leading to the desired terminal driving state on the map of the turning area represented by end pair of grid node and grid bin.

The foregoing finding the nearest orientation grid bin of the nearest location grid node, the linkage between the layers and physical path expansion, and the expansion of the entire trajectory is ultra-fast and computationally light, as the node optimal connection information has been predefined offline, and the online process only needs to retrieve such information link by link. No recursive computation is involved to fully expand the trajectory, and therefore the computation time and memory usage can be accurately expected in advance.

As the vehicle drives forward, the process includes finding the nearest orientation grid bin of the nearest location grid node, the linkage between the layers and physical path expansion, and the expansion of the entire trajectory is constantly repeated. An optimal driving trajectory is constantly updated to accommodate the trajectory tracking error that happens in the real world. The process formulates a closed-loop feedback for the vehicle's real-time trajectory tracking driving state, which enhances the system robustness against disturbances and system performance imperfections.

Disclosed are techniques for generating a compact library of optimal paths that can be stored at an autonomous vehicle and taken from one location to another. For example, the compact library may include optimal paths through a parking lot for an autonomous tractor-trailer vehicle that takes into account the wide turns taken by a tractor-trailer. The paths are optimal in that the paths provide avoidance of collision with fixed objects, the paths minimize steering changes, prevent jackknifing of the tractor-trailer, and ensures that the paths taken are smooth. The paths are optimal in balancing passenger comfort and vehicle steering effort, while following the traffic rules presented by lane semantic tags. The library is read online to obtain an optimal path from the vehicle's instantaneous state by using the autonomous vehicle's onboard computing resource, but the library of optimal paths may be generated offline using other computing resources and not using the autonomous vehicle's computing resources.

A given map may correspond to a selected area such as a parking lot, narrow street, or other fixed area. On the given map, the offboard computer performs an optimal driving trajectory search within a search space, generates a candidate trajectory, and evaluates the candidate trajectory. The disclosed techniques use an exhaustive search and data compression algorithm to process a 2D map space into a collection of all possible optimal driving trajectories in the map space, and to compress all possible driving trajectories into a compact optimal path library that is small enough to store in the autonomous vehicle's onboard memory. The optimal path library is offline in that it does not use computational resources at the vehicle and does not rely on communication to another system such as a server that is away from the vehicle. The system may include a localization system for providing real-time vehicle location used in reading the online the optimal path library. The system may also include memory space for storing the optimal path library, and a computer that includes a database reader to expand the compact representation of the paths into an actual path using a digital key. The disclosed techniques transfer a complicated tractor-trailer vehicle path planning task from being online to offline.

The disclosed techniques may be used by an autonomous driving system on a tractor-trailer truck to generate an optimal driving path through a pre-mapped space using a pre-generated offline optimal path library. The space may include areas that are challenging for turning a tractor-trailer, such as areas with tight turns, parking lots, docking areas, narrow streets, and so on.

As an illustrative example, the autonomous vehicle may be travelling from one location to another distant location. The starting location may be a parking lot that has been pre-mapped. The autonomous driving system may request from the path library system a driving path through the parking lot. The request may include the vehicle location and orientation information so that an optimal path will take into account the orientations and locations of the tractor and the trailer. In response to the request, an optimal driving path is read from the pre-generated and compressed optimal path library stored on the autonomous vehicle, and then expanded into a high-fidelity path data in the mapped physical space with minimal computation. The expansion process is further described below and uses a digital key. The generated driving path from the map's optimal path library will guide the vehicle along the path and include collision avoidance for fixed objects, minimal steering effort, optimized smoothness, jackknife prevention, and other predefined performance factor optimizations. Path planning for a tractor-trailer that must drive in reverse is difficult due to the unstable nature of a tractor-trailer driving in reverse and the tendency to jackknife. The disclosed subject matter prevents jackknifing due to the offline exhaustive search.

The disclosed techniques offer advantages including transferring the autonomous vehicle path planning, which is computationally expensive for tractor-trailer vehicle geometry, from an online computation taxing the vehicle's onboard computers into an offline computation where significantly larger computational resources are available, and more time is available. This reduces hardware cost for the computers onboard the autonomous vehicle. Offline path generation also improves the flexibility of a path planning cost function by allowing mathematical complexity. The conventional approach using online path planning must perform extensive approximations for collision avoidance to maintain solvable mathematical complexity. The disclosed techniques allow collision avoidance optimization that includes accurate vehicle location, and balances between passengers' psychological comfort (closeness to objects), lane semantic tags, traffic rules, operational practice, etc. with fewer computational resources required on the autonomous vehicle. The disclosed offline path library generation method is improved over the conventional approach due in part to the disclosed technique's exhaustive search through the technique of reverse direction search.

FIG. 1 depicts a process 100, in accordance with some example embodiments. The process generates an optimal path for a vehicle through a mapped area by evaluating all feasible path connections. The optimal path generation process may start at the desired ending location for the vehicle and end at the starting location for the vehicle. By exhaustively searching for a path from the ending location to the starting location, the search will result in globally optimal paths for any initial states within the search space.

At 110, the mapping process is provided with a lower layer position grid node denoted by i and a heading angle grid bin denoted by j, and an upper layer position grid node denoted by k. The upper layer position grid node corresponds to a later node along the optimal path in the search direction or a direction corresponding to an earlier node in time, and the lower layer position grid node corresponds to an earlier node along the optimal path in the search direction or a direction corresponding to a later node in time. Associated with each node such as nodes i and k are parameter values including parameters describing the vehicle location and position including x coordinates, y coordinates, heading angles, articulation angles, steering angles, step action costs, step accumulative costs, and linkage information to neighboring layer nodes, which identify the index range of reachable nodes and the node index of an optimal connection leading to the desired terminal state.

At 120, an arc solver determines a continuous arc path of constant curvature from location $(x_0, y_0)$ to a point $(x_t, y_t, \theta_t)$ that will be travelled by the vehicle after $(x_0, y_0)$. $\theta_t$ is representative of the orientation of the tractor at the terminal point of a path arc, which is the heading angle when the path arc reaches to the lower layer position grid node. The arc solver determines parameter values of the tractor driving arc path that would cause the tractor-trailer to move from $(x_0, y_0)$ to a point $(x_t, y_t, \theta_t)$, which includes the arc curvature $\kappa$, arc length $L_{Arc}$, and the tractor vehicle's initial heading angle $\theta_0$.

At 130, a kinematic solver solves for the tractor-trailer kinematic states along the arc path in reverse time, which includes the continuous traces of tractor heading angle, tractor rear axle center location, tractor steering angle, trailer heading angle, trailer rear axle center location, and trailer articulation angle.

At 140, a vehicle body coordinates solver determines the positions of selected points of the tractor-trailer along the arc path. For example, the selected points on the tractor-trailer may include wheel locations of the tractor and the trailer, carriage body corners for collision avoidance with fixed objects, locations of the high points of the tractor trailer for verifying height clearance with fixed objects, and low points of the tractor trailer for verifying ground clearance with fixed objects.

At 150, one or more cost or performance metrics are applied to the arc path. The metrics may include a curvature metric, a curvature change metric, an articulation angle metric for jackknife prevention, a distance to lane center metric, a heading angle tracking metric, a body in lane metric, and/or a body in the mapped permissible area metric. The following describes an example of how values for the above-noted metrics may be affected by driving a tractor-trailer along the arc. For example, the curvature metric may generate a higher (or lower) value indicating a more desirable path for an arc path that has a larger radius of curvature compared to an arc path with a smaller radius of curvature. In another example, the curvature change metric, may generate a higher (or lower) value indicating a more desirable path for an arc path that has a smaller rate of change of a turning radius of curvature compared to an arc path with a larger rate of change of the radius of curvature. In another example, the articulation metric may generate a higher (or lower) value indicating a more desirable path for an arc path that where a maximum angle between the tractor and the trailer is smaller (closer to straight line alignment between the tractor and the trailer) compared to an arc path where a maximum angle between the tractor and the trailer is larger, especially when the angle is close to an angle that may cause a jackknife. In another example, the distance to lane center metric may generate a higher (or lower) value indicating a more desirable path for an arc path that stays close to the driving lane center line. In another example, the heading angle tracking metric may generate a higher (or lower) value indicating a more desirable path for an arc path on which the vehicle's driving heading angle stays close to the driving lane center's heading angle. In another example, the body in lane metric may generate a higher (or lower) value indicating a more desirable path for an arc path through which the vehicle's bodies stay within the lane area as much as possible while driving. In another example, the body in the mapped permissible area metric may generate a higher (or lower) value indicating a more desirable path for an arc path that makes the tractor trailer vehicle body stay within the mapped permissible area as much as possible.

Generation of a penalty for body movement out of the mapped permissible area may be performed using the check of "point in a polygon." To reduce the computation time in the optimal path library offline search process, only map edge points in a radius of the vehicle center (defined as tractor rear axle center) are evaluated. Also, points of interest on the vehicle left side are only checked at map edge points on the left side of the vehicle (so does the right side), and the process is done for the tractor and the trailer vehicle separately. If map edge point(s) are inside the polygon defined by vehicle, a penalty is generated based on the distance from the evaluated point on vehicle to the map edge line drawn by the nearest two map edge points. If the evaluated point is on the tire, then a penalty jump is further added. Since the polygon by vehicle shape is convex, an interior check can be done by determining if the point is always on the same side of the vector circle defined by the carriage. Using the equation below, if the generated penalty $a_{i,j}$ by point i with respect to the four edge vectors are all with same sign, then the map edge point is within the vehicle body polygon and the corresponding penalty generates:

$$a_{i,j} = (y_i - y_{0,j})(x_{t,j} - x_{0,j}) - (x_i - x_{0,j})(y_{t,j} - y_{0,j}) \quad \text{Equation 1.}$$

In Equation 1, $(x_i, y_i)$ represent coordinates of a point on the map, j is a variable corresponding to the vehicle edge vectors (typically 4, for four edges), and $(x_{0,j}, y_{0,j})$ and $(x_{t,j}, y_{t,j})$ represent starting positions of the vehicle and a position at vehicle at time t. At 160, the overall performance of a particular arc path may be determined by adding the values of the metrics together, or a weighting the metrics more heavily than others to cause some metrics to have a larger impact on the overall performance metric compared to other metrics.

At 170, an evaluation may be performed on the arc path based on the overall performance in light of the metric values. Any of the metrics may have ranges of acceptable values. If a metric lies outside the range, the arc may be avoided or not selected.

The disclosed method for offline path library generation is mathematically provable to be a globally optimal path given a set of performance metrics (also referred to as cost metrics). The method of finding the optimal path includes searching all possible actions that can be taken by the tractor-trailer and evaluating the performance/cost metrics, starting from the desired terminal state point. From a search starting location, which is also a terminal state location, a family of paths exist where sections of each path may be represented by nodes. Each node corresponds to a family of parameter values including an x coordinate, a y coordinate and a heading angle. The nodes together may be referred to as a state space and each node as a state space node. Each state space node of the map region links the decisions of preceding choices to get to that node including accumulated historical action metric values and costs. Due to an optimality principle, the generated optimal path library finds the global optimal path and actions for any given vehicle location and orientation state within the map and maintains finite computation memory and time usage in the offline search process.

The disclosed offline path library generation method may be exhaustive to any given discretized vehicle location and orientation within the mapped range, and all of the paths originating from a vehicle starting state converge into one optimal path for the mapped area. This property robustly handles all potential autonomous driving states in the defined map region, and a selected path promotes the autonomous vehicle's motion control on stability convergence performance. The property of common convergence trace provides predictability merit on vehicle path and motion planning, which is helpful for autonomous driving safety protection. To achieve exhaustive search results for a vehicle heading angle state while guaranteeing smoothness in the path, the disclosed method develops a dynamic resolution technique that dynamically generates the heading angle resolution grid values based on optimal solution local progressing at each position state instance.

To compress the exhaustive optimal path library into less memory, the optimal paths are stored in the analytical solution form of arc segments across the path states. Each arc piece corresponds to an arc from one path state to another path state. The enumeration of optimal paths is compressed from long numerical vectors with high dimensions into a guided low-dimensional compact vector library through analytical arc solutions and node linkage information. The optimal path to an endpoint given the starting position and orientation can be extracted and expanded into a path array in cartesian space for any discrete space resolution requirements (either fixed or variable) using a path library reading key. Look-up of the optimal path is ultra-fast (roughly 10 milliseconds depending on the total path length) and use minimal online computational resources (at only order of n, represented as o(n), level memory, in comparison an online path planner needs at least o(n²) level memory). The disclosed technique transfers the heavy computational load of autonomous tractor-trailer vehicle path planning from an online process to an offline process. For the online process, all that is required is that the optimal path be read by the vehicle onboard computer.

Figure 2A:
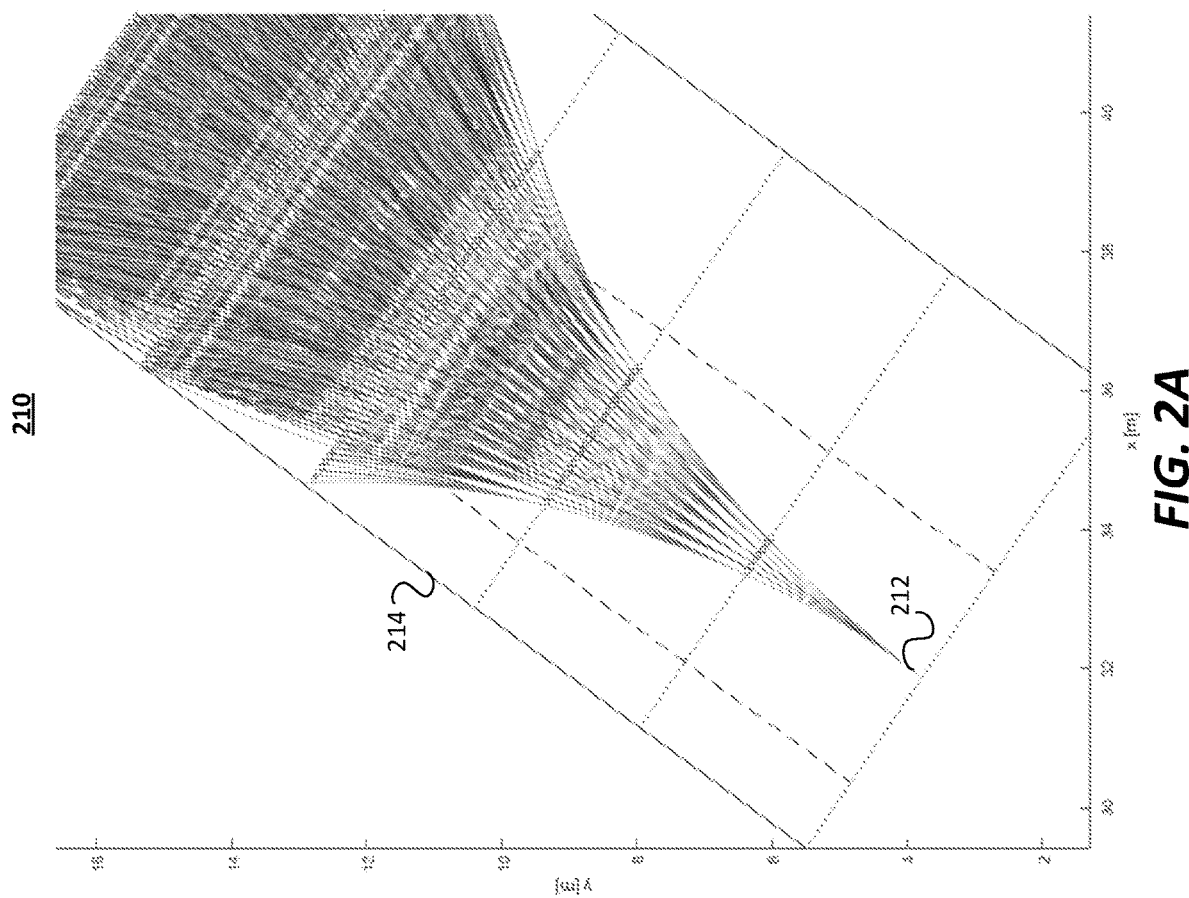
FIG. 2A depicts an example of offline searching for a family of arc paths from a target ending location and orientation to all possible starting locations and orientations in the mapped area with a discrete resolution.

FIG. 2A depicts an illustration at 210 of a family of arc paths originating at an ending location for an autonomous vehicle. Shown at 212 is an example of an ending location for an autonomous vehicle which is also the starting location for searching optimal paths that lead to the designated ending location for all nodes on the state space in the reverse direction. Fanning out from ending location 212 are a family of possible arc (or path) segments. Each arc segment begins at a node and ends at another node. Arc segments are pruned to remove nodes that cannot be reached based on limitations of the vehicle such as a tractor-trailer. The arc segments shown at 210 are all the possible arc segments originating at 212 before the optimal path is chosen from a starting location.

Figure 2B:
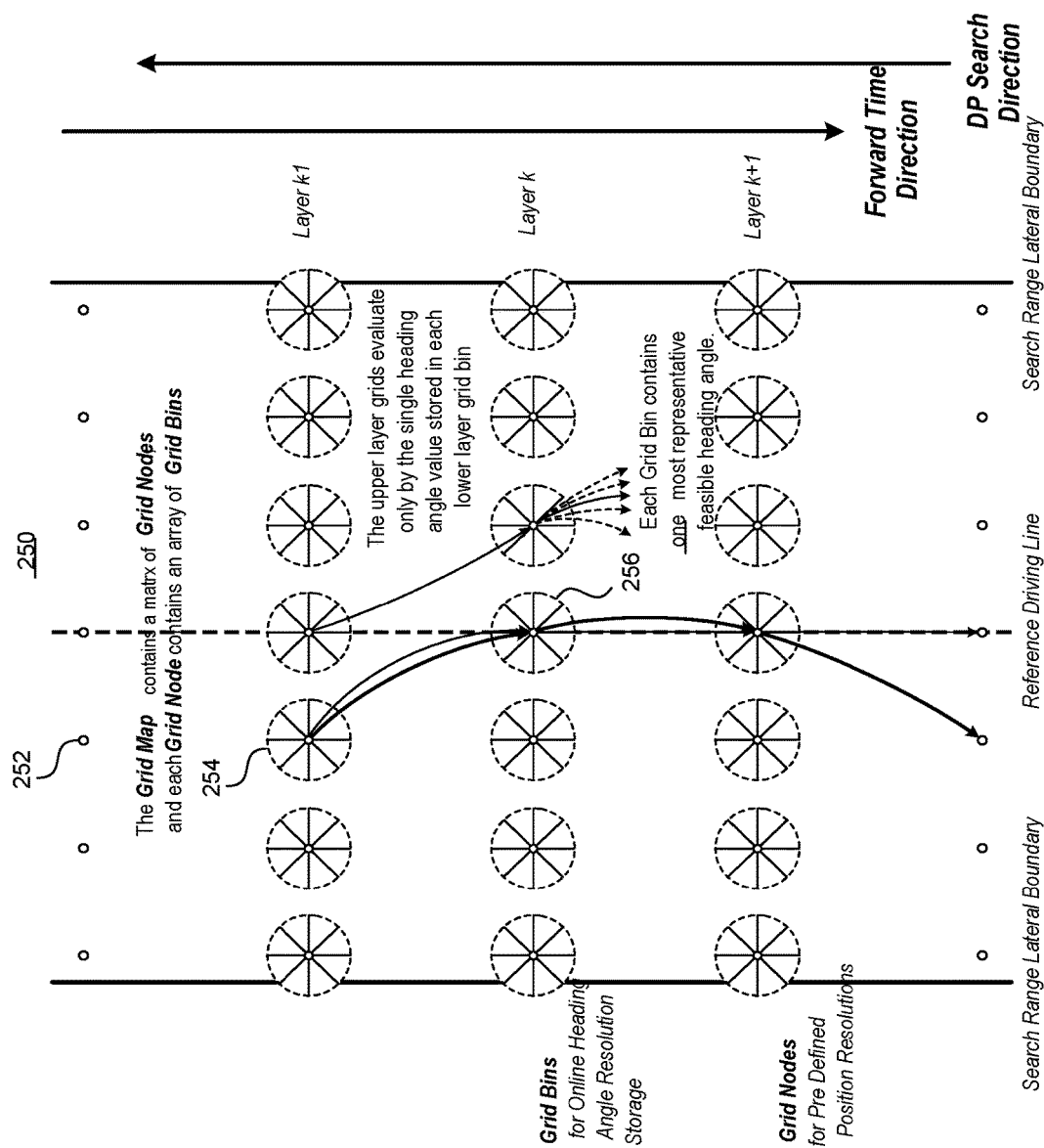
FIG. 2B depicts an example of position grid nodes connected with path arcs through various heading angle grid bins, in accordance with some embodiments.

FIG. 2B depicts an illustration at 250 of locations or points in a grid map with bins and nodes. Shown at 250 are examples of grid points with associated bins and nodes. The map of an area may be overlaid by a grid map which contains regularly spaced grid nodes including grid node 252. Each node includes grid bins such as grid bin 254. The spacing between grid nodes is determined by a predefined resolution. For example, for a given map a higher resolution grid map includes more total grid nodes than a grid map with a lower resolution grid map. Each grid bin contains a most feasible heading angle for the vehicle to travel from the corresponding grid node. Upper layer grid bins such as grid bin 254 corresponding to earlier driven locations (and later searched locations) evaluate to determine a possible path based on the single heading angle stored in the next lower grid bin such as grid bin 256.

Figure 3:
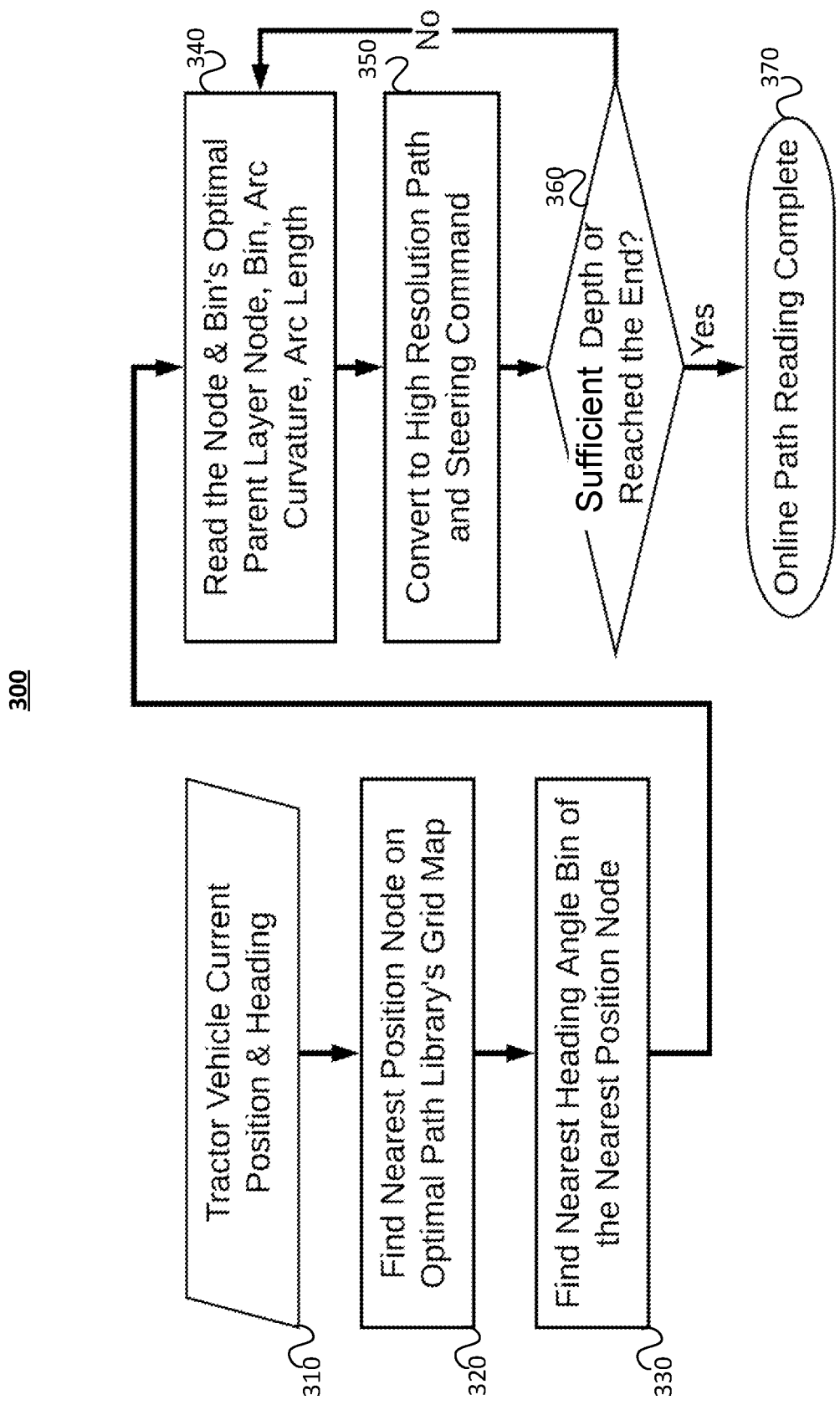
FIG. 3 depicts an example of an online reading process for online optimal path library usage, in accordance with some embodiments.

FIG. 3 depicts a process 300 for determining an optimal path, in accordance with some example embodiments. At 310, the vehicle/tractor-trailer position and heading are determined. At 320, the position of the tractor-trailer is matched to the closest grid node in the mapped area and included in the path library. At 330, the bin with the closest heading angle to the vehicle heading is selected. At 340, the optimal parent layer node, bin, arc curvature, and arc length are read based on the matched grid node and the selected vehicle heading. The arc curvature may be expressed as the inverse of the constant steering radius needed to follow the curved path between two grid nodes and the arc length is the length of the curved path between the corresponding grid nodes along the arc curvature. The parent node is the next node farther away from the endpoint. At 350, the parent node location, arc curvature, and arc length are converted to a steering command to send to the autonomous steering controller. At 360, if the desired terminal location is reached, then the process stops. If the desired terminal location is not reached, then the process returns to step 340 and repeats until the desired terminal point is reached. At 370, the optimal path has been read.

The size of an optimal path library affects the online memory usage, since the online map is stored in the vehicle. The optimal map size M can be estimated using:

$$M = \frac{W_{SP}}{dW} \cdot \frac{360}{d\theta} \cdot \frac{L_{SP}}{dL} \cdot N_u \cdot B, \qquad \text{Equation 2.}$$

where $W_{SP}$ is the width of the offline path search region. A two-lane width of search path is actually equivalent of allowing vehicle body to occupy three lanes, since the search point of interest is located at the vehicle longitudinal center line. Considering the typical lane width is at 3.7 m, the search path width can be estimated at 7.4 m.

dW is the lateral distance resolution. dW=0.1 m has been determined as sufficient resolution accuracy.

dθ is the heading angle resolution. dθ=1 deg has been determined as sufficient resolution accuracy.

$L_{SP}$ is the total longitudinal distance of the offline path search region along the reference driving line.

dL is the longitudinal distance resolution between two lateral search layers. dL=3 m has been determined as sufficient resolution accuracy, even for the local turns being highly challenging for experienced human drivers.

$N_u$ is the number of variables in the optimal path map at each search step, which includes the processed grid node and bin's (1) heading angle value, (2) path curvature of the arc connection to the parent layer node, (3) path arc length of the arc connection to the parent layer node, (4) Parent layer lateral location grid node index of the path grid map, (5) Parent layer heading angle bin index of the path grid map.

B is the number of bits needed for storing each variable. The optimal path map contains 3 variables of single-precision floating point data, and 2 variables of integer data. Therefore, the total $N_u*B$ is at $3*4+2*2=16$ Byte.

An example estimate of dynamic programming optimal map size for a 1 kilometer path is approximately 142 Megabytes (Mb) memory. However, not all elements in the optimal path grid map is occupied with information, and smarter techniques can be applied to make the size smaller. For example, the useful part of heading angle search range is much less than 360 degrees, and the reachable range at each search step is even smaller. As a reference, the equivalent map stored by MatLab only takes 28 Mb memory. Furthermore, the dynamic programming path planning method only needs to be applied for the challenging wide turns. When long straight lanes exit, the vehicle path does not need to be refined in such a way. Therefore, a "compact 1 km path" as an example contains the wide turn path information of a much longer route.

Figure 4:
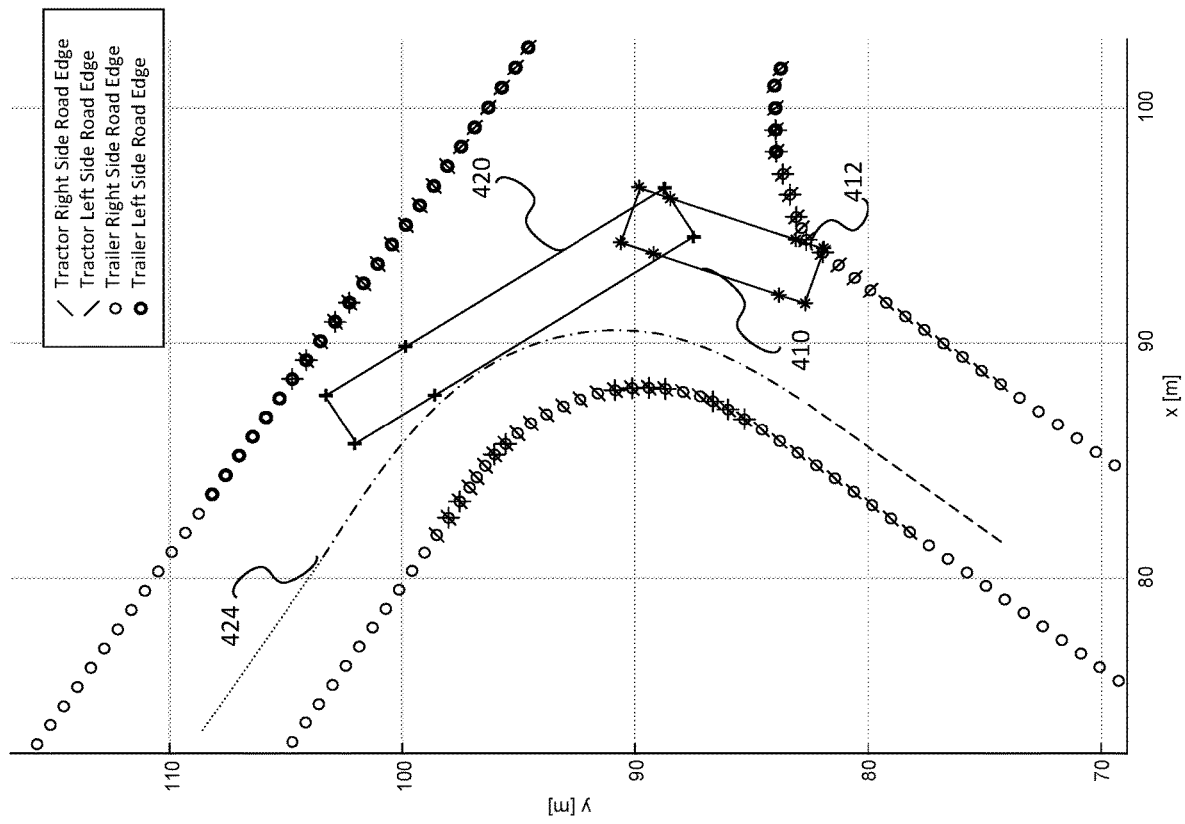
FIG. 4 depicts an example of a turn with a tractor trailer showing the various parts of the tractor-trailer with the relationships of the lane boundaries or road edges of the driving space, for generating penalties or costs of at least one of the performance metrics including body in lane metric, or body extends beyond a mapped permissible area metric, in accordance with some embodiments.

FIG. 4 depicts an example of a tractor 410 and a trailer 420. At 424 is an example path followed by the rear of the trailer. At 412 is an example path followed by the front of the tractor. The disclosed subject matter determines an optimal path around the curve shown in FIG. 4 (or any other curve).

Figure 5A:
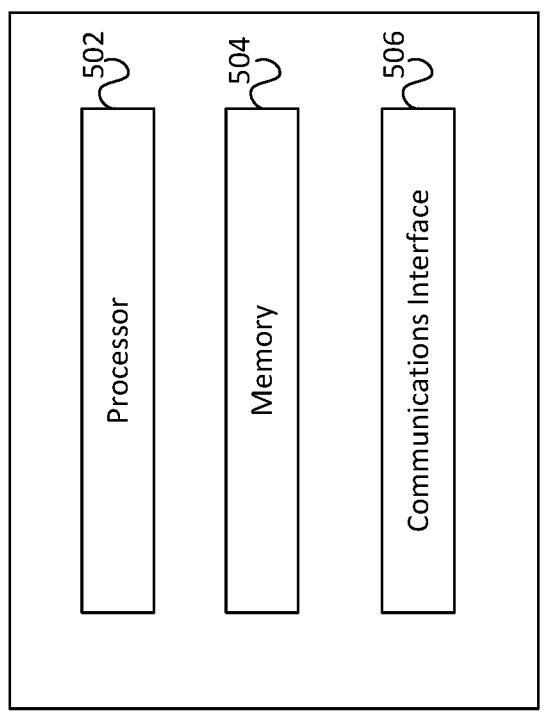
FIG. 5A depicts an example of a hardware platform.

FIG. 5A depicts an example of a hardware platform 500 that can be used to implement some of the techniques, processes, and/or functions described in the present document. For example, the hardware platform 500 may implement the processes 100, 210, 250, or 300 or other processes described above, and/or may implement the various modules described herein. The hardware platform 500 may include a processor 502 that can execute code to implement a method. The hardware platform 500 may include a memory 504 that may be used to store processor-executable code and/or store data. The hardware platform 500 may further include a communication interface 506. For example, the communication interface 506 may implement one or more wired or wireless communication protocols (Ethernet, LTE, Wi-Fi, Bluetooth, and so on). The hardware platform 500 may be used for implementing the offline server or the online server described herein.

Figure 5B:
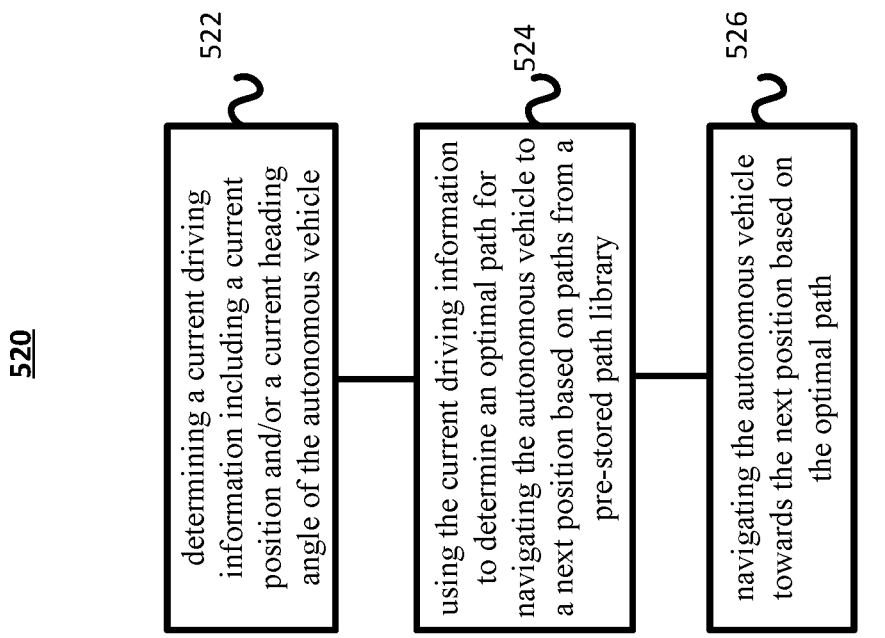
FIG. 5B is a flowchart of an example method of autonomous vehicle operation.

FIG. 5B is a flowchart of a method 520 for navigating an autonomous vehicle. The method includes, at 522, determining, by an online server located on an autonomous vehicle, a current driving information including a current position and/or a current heading angle of the autonomous vehicle.

The method 520 includes, at 524, using the current driving information to determine an optimal path for navigating the autonomous vehicle to a next position based on paths from a pre-stored path library. In some implementations, the pre-stored path library may be a database of possible paths that is computed based on an offline path library generation process. In some embodiments, the pre-stored path library may be stored in a compressed format such that the online server performs data expansion for receiving the possible paths.

The method 520 includes, at 526, navigating the autonomous vehicle towards the next position based on the optimal path. For example, the current position and the next position may be a grid node along a discretized grid map of the area in which the autonomous vehicle is operating, as described next.

The method 520 may further include determining, a grid node matching the current position and a grid bin associated with the grid node based on a current heading angle of the autonomous vehicle on a grid map in the pre-stored path library, retrieving, from the pre-stored path library, possible paths to a next grid node corresponding to the next position and a next grid bin based on the grid node and the grid bin, and generating, based on one of the possible paths, a steering command to navigate the autonomous vehicle. In some embodiments, the grid may be uniform over the entire area through which the autonomous vehicle is navigating. Alternatively, in some embodiments, the grid density, e.g., the placement of grid nodes, may be non-uniform. For example, near corners, grid nodes may be placed closer to each other, while in open areas grid nodes may be placed farther apart. The non-uniform gridding may enable provide more accurate maneuvering around critical areas such as corners, while keeping overall complexity of computation in an area about the same as uniform gridding, even reduced, compared to uniform gridding.

The method 520 may further include that the online server iteratively generates multiple steering commands to navigate the autonomous vehicle between multiple current positions and multiple next positions based on multiple optimal paths retrieved from the pre-stored path library such that a next position of a previous iteration is used as a current position of a next iteration until and end criterion is met by the autonomous vehicle. The steering commands may include, for example, a vehicle front wheel steering angle command, or a vehicle steering handwheel angle command, or a steering torque command to the steering actuator at a vehicle longitudinal wheel speed. Steering commands may also include activating or deactivating turn signals when the vehicle exceeds or falls below a curve angle in the optimal path to the next position.

Figure 5C:
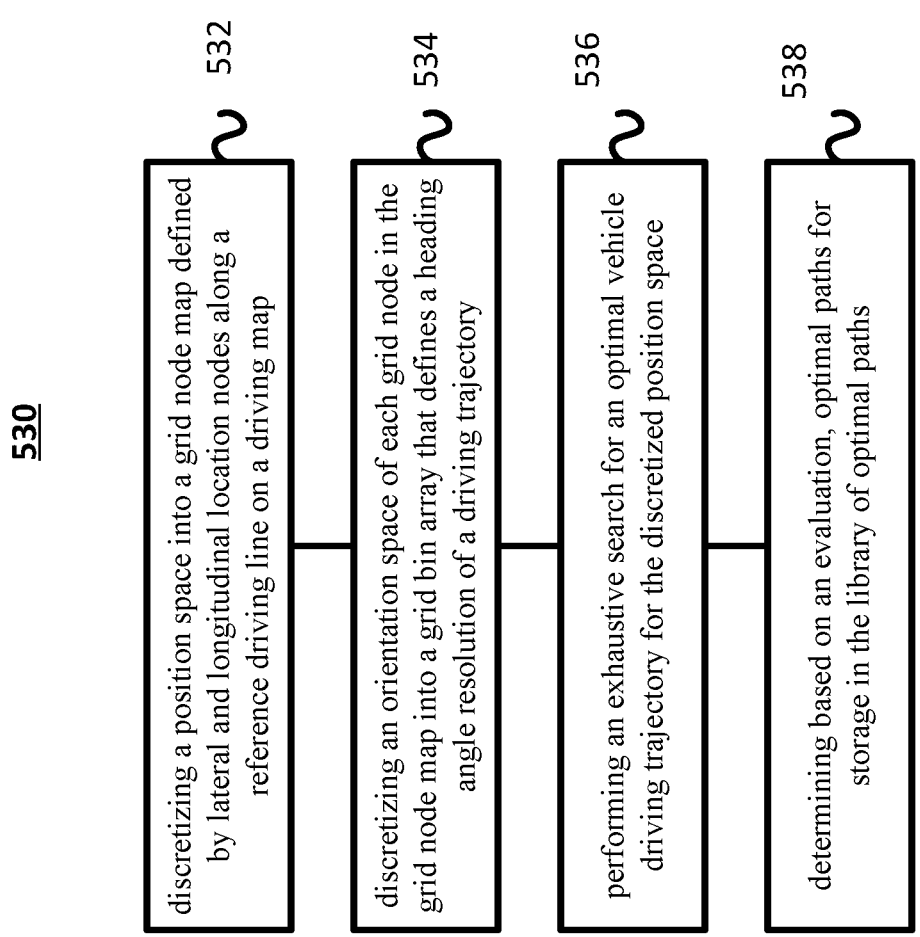
FIG. 5C is a flowchart of an example method for generating a library of optimal paths that can be used for autonomous vehicle navigation.

FIG. 5C shows a flowchart for an example method 530 for generating a library of optimal paths for an autonomous vehicle operation. The method 530 may be implemented by an offline server.

The method 530 includes, at 532, discretizing, by an offline server, a position space into a grid node map defined by lateral and longitudinal location nodes along a reference driving line on a driving map. As described above, in some embodiments, the discretization may be performed using a uniform grid. Alternatively, a non-uniform grid may be used in some embodiments.

The method 530 includes, at 534, discretizing, by the offline server, an orientation space of each grid node in the grid node map into a grid bin array that defines a heading angle resolution of a driving trajectory. Similar to the differing strategies of uniform vs non-uniform gridding options, the heading angle resolution may also be either uniformly discretized or may be non-uniformly discretized based on map features. For example, uniform discretization may be a straightforward gridding strategy based on a geographical resolution (e.g., divide a map region in 1 meter×1 meter grid bins). Alternatively, the angle discretization may take into account certain map features, e.g., corners, objects along the path that are to be avoided such as billboards or light poles such that a finer heading angle resolution is used in areas where such map features are present, while coarser heading angle resolution may be used in open areas.

The method 530 includes, at 536, performing, by the offline server, an exhaustive search for an optimal vehicle driving trajectory for the discretized position space, wherein the exhaustive search includes vehicle state vectors, wherein the exhaustive search includes evaluating driving trajectory connections between every two pairs of state space and grid nodes on two layers along a reference driving direction in the driving space to determine a best driving action leading to global optimal complete trajectories.

For example, the offline server may perform the evaluating operation by: constructing a trajectory arc between two grid nodes following a vehicle kinematic model by tracing from a trajectory heading angle of an optimal trace stored in a lower layer grid node's evaluated grid bin, wherein trajectory heading angle values stored in an upper layer grid nodes' grid bins are determined dynamically as generating the library proceeds, assigning costs for all of the trajectory connections to a layer of grid nodes, and saving optimal trajectory connections to every reachable grid node and grid bin pair, and deactivating grid node and grid bin pairs for the next layer's search evaluation when at least one criteria is violated. Here, an evaluation at each step further proceeds by expanding a vehicle kinematic trace defined by a bicycle model between every two feasible grid nodes into traces for tractor-trailer vehicles that accommodates trailer motion states, and into traces of vehicle body corners and vehicle tires that relate to motion control when driving in a confined space. Furthermore, in some embodiments, the linkage information for optimal trajectory connections is saved to the optimal path library.

The method 530 includes, at 538, determining, by the offline server based on an evaluation, optimal paths for storage in the library of optimal paths.

In some implementations, for implementation of the method 530, each grid node defines one deterministic location coordinate set before the search starts, and each grid bin defines a memory space for a range of orientation angles of which a specific value will be determined dynamically as generating the library proceeds.

In some embodiments of the method 530, the search process repeats by repeating the evaluating the driving trajectory connections, the expanding the vehicle kinematic trace, and the keeping only the optimal trajectory connections to every reachable pair of grid nodes for each unevaluated layer of grid nodes until reaching the other margin of the interested area on the map which corresponds to the margin of searchable space of the map area.

In some embodiments, the location grid node map and grid bin array are a state space grid map. A state space grid map may, for example, logically link grid nodes with respect to each other's position, e.g., for each grid node, the state space map may include incoming links to other grid nodes from which the grid node can be reached along n paths (n being an integer, typically equal to 1) and outgoing links to other grid nodes that can be reached within m paths (m being an integer, typically equal to 1).

In some embodiments, each vehicle state vector is defined by a vehicle x-coordinate value, a vehicle location y-coordinate value, and a vehicle heading angle value. As previously described, the (x, y, angle) triplet for the vehicle state vector may span a uniform or a non-uniform resolution in the three axes domains (x, y, angle).

In some embodiments, the exhaustive search is performed in a backward direction from the terminal state to a starting state, and only a cumulative optimal solution is saved for each reachable discretized state space grid node in the searched region.

In some embodiments, the terminal state defines a margin of the searchable space of the map area.

In some embodiments, the offline server determines and stores the optimal paths prior to the autonomous driving vehicle arriving at the position space. For example, the optimal path library may be pre-loaded on an onboard storage prior to the autonomous vehicle commencing its journey.

Figure 5D:
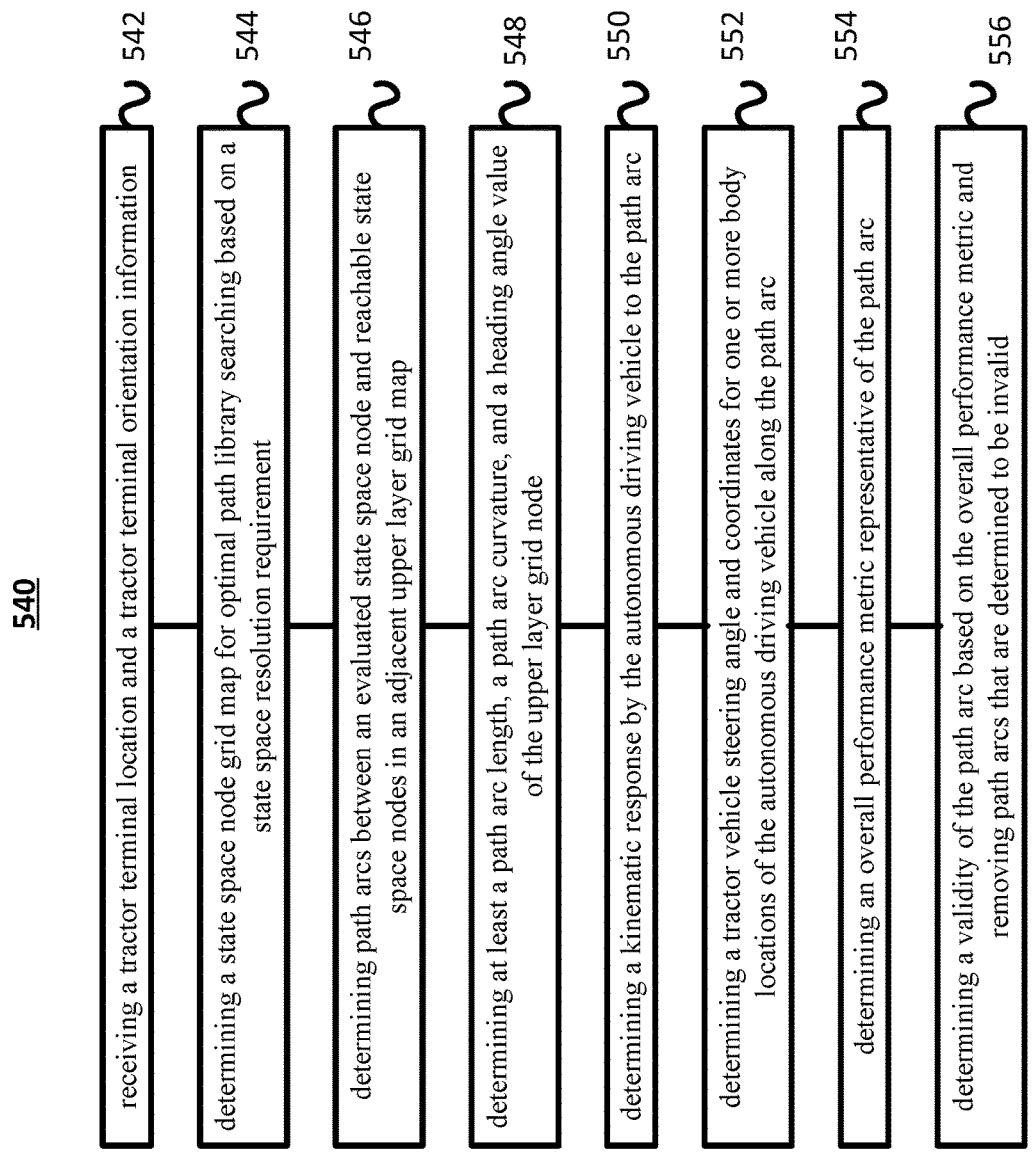
FIG. 5D is a flowchart of another example method for generating a library of optimal paths that can be used for autonomous vehicle navigation.

FIG. 5D is a flowchart for an example method 540. The method 540 may be implemented by offline server for generating a library of optimal paths for an autonomous driving vehicle. An optimal path may be, for example, a path that avoids collision and/or minimizes steering changes, and/or prevents jack-knifing and/or smooth and within lane boundaries.

The method 540 includes, at 542, receiving, at an offline server, a tractor terminal location and a tractor terminal orientation information.

The method 540 includes, at 544, determining, at the offline server, a state space node grid map for optimal path library searching based on a state space resolution requirement.

The method 540 includes, at 546, determining, at the offline server, path arcs between an evaluated state space node and reachable state space nodes in an adjacent upper layer grid map.

The method 540 includes, at 548, determining, at the offline server, from a path arc from the path arcs, at least a path arc length, a path arc curvature, and a heading angle value of the upper layer grid node.

The method 540 includes, at 550, determining, at the offline server, a kinematic response by the autonomous driving vehicle to the path arc.

The method 540 includes, at 552, determining, at the offline server, from the kinematic response, a tractor vehicle steering angle and coordinates for one or more body locations of the autonomous driving vehicle along the path arc.

The method 540 includes, at 554, determining, at the offline server, an overall performance metric representative of the path arc by applying performance metrics to the path arc, the steering controller steering angle, the kinematic response, and the one or more body locations along the path arc. In various embodiments, various performance metrics may be used. For example, the performance metrics may include one or more of a curvature metric, a curvature change metric, an articulation metric, a distance to lane center metric, a lane heading angle tracking accuracy metric, a body in lane metric, a body extends beyond a mapped permissible area metric.

The method 540 includes, at 556, determining, at the offline server, a validity of the path arc based on the overall performance metric and removing path arcs that are determined to be invalid.

In some embodiments, the method 540 includes repeating the determining the path arcs, the determining the at least the path arc length, the path arc curvature, the heading angle value, the determining the kinematic response, and the determining the overall performance metric to generate a plurality of arc paths and corresponding overall performance metrics.

In some embodiments, the method 540 includes selecting an optimal path from the plurality of arc paths based on the overall performance metrics, wherein the optimal path has a best overall performance metric compared to other of the plurality of arc paths.

In some embodiments, a system for navigating an autonomous vehicle includes an offline server configured to generate a library of optimal paths for navigating a geographic area, wherein the geographic area is represented as a grid node map and an orientation grid bin map and wherein the optimal paths correspond to paths between pairs of grid node pairs in the grid node map based on optimization criteria; a storage device on the autonomous vehicle for storing the library of optimal paths, and an online server located on the autonomous vehicle configured to access information from the library of optimal paths from the storage device based on a current position and a current heading of the autonomous vehicle, and navigating the autonomous vehicle through the geographic area based on the information. The online server may be configured to implement a method described herein. The offline server may be configured to generate a library of optimal paths using a method described herein.

The offline server described in the present document may be implemented using a hardware platform (e.g., FIG. 5A) or may be implemented using distributed computing resources such as cloud computing resources. To be able to perform an exhaustive analysis of possible optimal paths, the offline server may use computational resources that are greater than the computational resources that are available to online, or on-board, computers in an autonomous vehicle. The autonomous vehicle and the online computer may communicate with the offline server via a communication interface such as a cellular or a Wi-Fi wireless communication channel or an ethernet or USB cable before a driving trip begins.

In some embodiments, the library of paths represents an exhaustive search for optimal vehicle driving trajectories for a predefined and discretized driving space, and wherein the exhaustive search includes a plurality of combinations of vehicle location and vehicle orientation in the state space node grid map. In some embodiments, the library includes compact path information for vehicle states in a geographic area.

Figure 6:
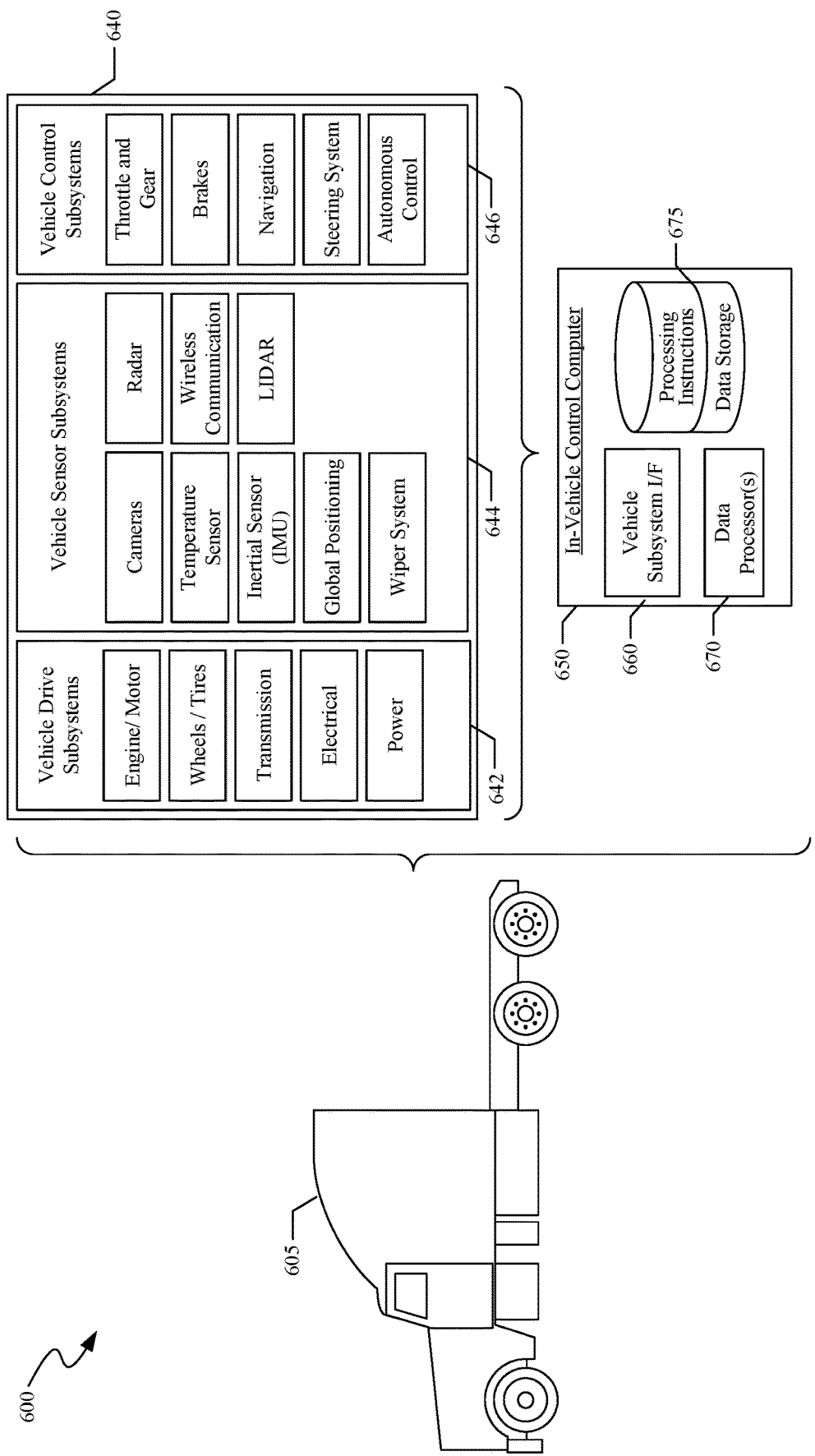
FIG. 6 shows a block diagram of an example vehicle ecosystem in which autonomous driving operations can be performed.

FIG. 6 shows a block diagram of an example vehicle ecosystem 600 in which autonomous driving operations can be determined. The vehicle ecosystem 600 may be used to implement the online server and its operations related to path selection and vehicle steering.

As shown in FIG. 6, the vehicle 605 may be a semi-trailer truck. The vehicle ecosystem 600 includes several systems and components that can generate and/or deliver one or more sources of information/data and related services to the in-vehicle control computer 650 that may be located in a vehicle 605. The in-vehicle control computer 650 can be in data communication with a plurality of vehicle subsystems 640, all of which can be resident in the vehicle 605. A vehicle subsystem interface 660 is provided to facilitate data communication between the in-vehicle control computer 650 and the plurality of vehicle subsystems 640. In some embodiments, the vehicle subsystem interface 660 can include a controller area network (CAN) controller to communicate with devices in the vehicle subsystems 640.

The vehicle 605 may include various vehicle subsystems that support the operation of vehicle 605. The vehicle subsystems may include a vehicle drive subsystem 642, a vehicle sensor subsystem 644, and/or a vehicle control subsystem 646. The components or devices of the vehicle drive subsystem 642, the vehicle sensor subsystem 644, and the vehicle control subsystem 646 as shown as examples. The vehicle drive subsystem 642 may include components operable to provide powered motion for the vehicle 605. In an example embodiment, the vehicle drive subsystem 642 may include an engine or motor, wheels/tires, a transmission, an electrical subsystem, and a power source.

The vehicle sensor subsystem 644 may include a number of sensors configured to sense information about an environment or condition of the vehicle 605. The vehicle sensor subsystem 644 may include one or more cameras or image capture devices, one or more temperature sensors, an inertial measurement unit (IMU), a Global Positioning System (GPS) transceiver, a laser range finder/LIDAR unit, a RADAR unit, and/or a wireless communication unit (e.g., a cellular communication transceiver). The vehicle sensor subsystem 644 may also include sensors configured to monitor internal systems of the vehicle 605 (e.g., an 02 monitor, a fuel gauge, an engine oil temperature, etc.).

The IMU may include any combination of sensors (e.g., accelerometers and gyroscopes) configured to sense position and orientation changes of the vehicle 605 based on inertial acceleration. The GPS transceiver may be any sensor configured to estimate a geographic location of the vehicle 605. For this purpose, the GPS transceiver may include a receiver/transmitter operable to provide information regarding the position of the vehicle 605 with respect to the Earth. The RADAR unit may represent a system that utilizes radio signals to sense objects within the local environment of the vehicle 605. In some embodiments, in addition to sensing the objects, the RADAR unit may additionally be configured to sense the speed and the heading of the objects proximate to the vehicle 605. The laser range finder or LIDAR unit may be any sensor configured to sense objects in the environment in which the vehicle 605 is located using lasers. The cameras may include one or more devices configured to capture a plurality of images of the environment of the vehicle 605. The cameras may be still image cameras or motion video cameras.

The vehicle control subsystem 646 may be configured to control operation of the vehicle 605 and its components. Accordingly, the vehicle control subsystem 646 may include various elements such as a throttle and gear, a brake unit, a navigation unit, a steering system and/or an autonomous control unit. The throttle may be configured to control, for instance, the operating speed of the engine and, in turn, control the speed of the vehicle 605. The gear may be configured to control the gear selection of the transmission. The brake unit can include any combination of mechanisms configured to decelerate the vehicle 605. The brake unit can use friction to slow the wheels in a standard manner. The brake unit may include an Anti-lock braking system (ABS) that can prevent the brakes from locking up when the brakes are applied. The navigation unit may be any system configured to determine a driving path or route for the vehicle 605. The navigation unit may additionally be configured to update the driving path dynamically while the vehicle 605 is in operation. In some embodiments, the navigation unit may be configured to incorporate data from the GPS transceiver and one or more predetermined maps so as to determine the driving path for the vehicle 605. The steering system may represent any combination of mechanisms that may be operable to adjust the heading of vehicle 605 in an autonomous mode or in a driver-controlled mode.

The autonomous control unit may represent a control system configured to identify, evaluate, and avoid or otherwise negotiate potential obstacles in the environment of the vehicle 605. In general, the autonomous control unit may be configured to control the vehicle 605 for operation without a driver or to provide driver assistance in controlling the vehicle 605. In some embodiments, the autonomous control unit may be configured to incorporate data from the GPS transceiver, the RADAR, the LIDAR, the cameras, and/or other vehicle subsystems to determine the driving path or trajectory for the vehicle 605.

Many or all of the functions of the vehicle 605 can be controlled by the in-vehicle control computer 650. The in-vehicle control computer 650 may include at least one data processor 670 (which can include at least one microprocessor) that executes processing instructions stored in a non-transitory computer readable medium, such as the data storage device 675 or memory. The in-vehicle control computer 650 may also represent a plurality of computing devices that may serve to control individual components or subsystems of the vehicle 605 in a distributed fashion.

The data storage device 675 may contain additional instructions as well, including instructions to transmit data to, receive data from, interact with, or control one or more of the vehicle drive subsystem 642, the vehicle sensor subsystem 644, and the vehicle control subsystem 646. The in-vehicle control computer 650 can be configured to include a data processor 670 and a data storage device 675. The in-vehicle control computer 650 may control the function of the vehicle 605 based on inputs received from various vehicle subsystems (e.g., the vehicle drive subsystem 642, the vehicle sensor subsystem 644, and the vehicle control subsystem 646).

Figure 7:
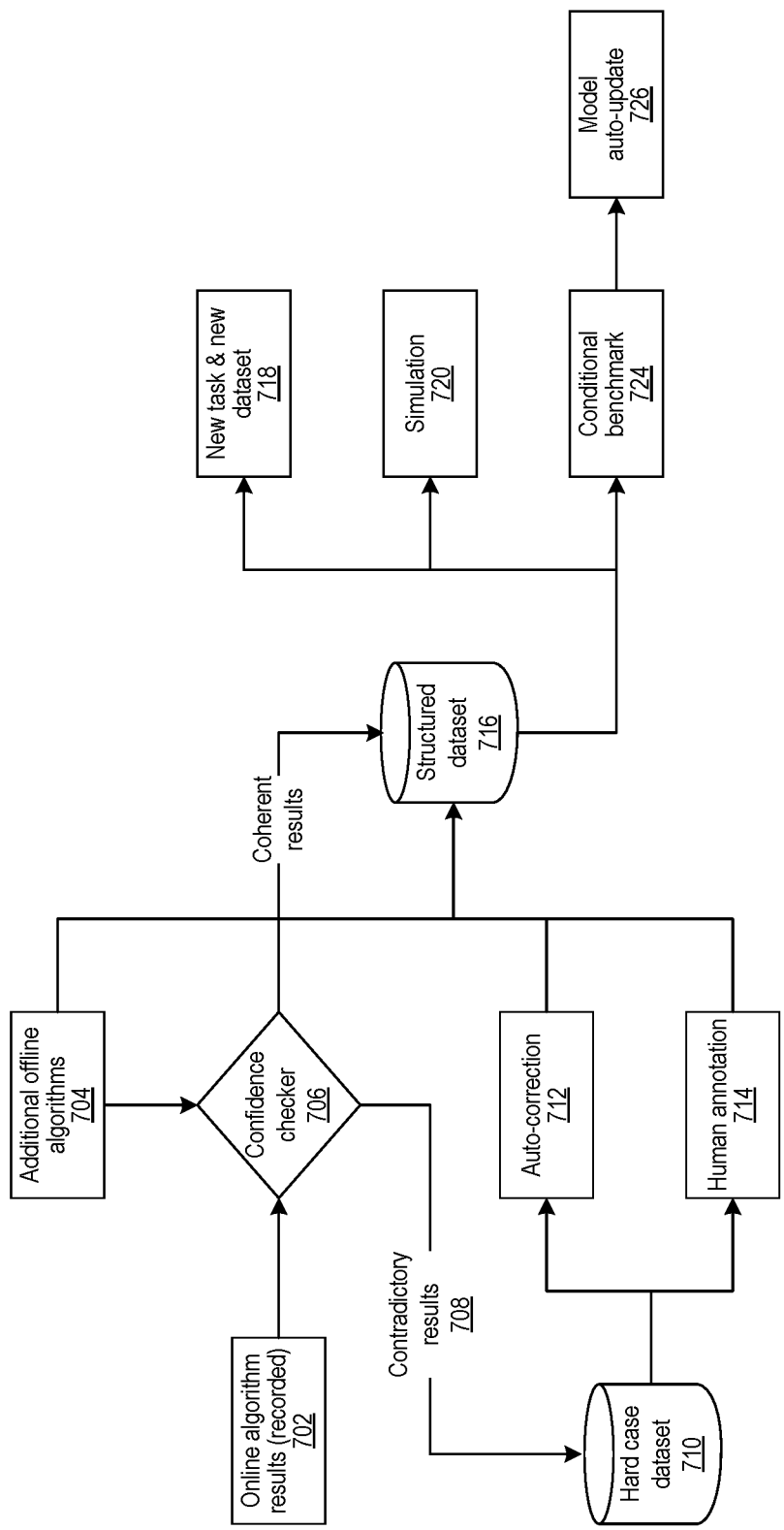
FIG. 7 shows an exemplary flowchart for software-controlled operation of an autonomous vehicle.

FIG. 7 shows an exemplary process for updating a software-based control of autonomous vehicles. This process may be implemented by the online server. In the updating process, a confidence checker module may perform a confidence checking operation 706 using online algorithm results (702) and offline algorithm results (704) obtained from previous operation of the autonomous vehicle. At operation 702, a confidence checker module of a computer (e.g., shown as 425 in FIG. 8) is a result of online algorithms that have been performed by an in-vehicle control computer to perform autonomous driving related operations. Online algorithm results may include a first set of data that describes autonomous driving operations in response to a known scenario. For example, the first set of data related to autonomous driving operations may include the in-vehicle control computer determining that a steering wheel motor needs to be turned 15 degrees clockwise to steer the autonomous vehicle when the autonomous vehicle reaches a known intersection. The first set of data related to autonomous driving operations may also provide status information of the various aspects of the autonomous vehicle, (e.g., speed, brake amount, transmission gear) when the autonomous vehicle is being driven through the known scenario.

In some embodiments, the online algorithm results may include health status information of the various devices and autonomous driving software operating in the in-vehicle control computer. The health status information may include one or more error codes generated by one or more devices and/or autonomous driving software when the autonomous vehicle was being driven. The online algorithm results may include additional explanation of the reason why the error code was generated and the time when the error code was generated.

At operation 704, the confidence checker module of the computer receives additional offline algorithms and can process the known scenario with the additional offline algorithm. In some embodiments, the additional offline algorithm may be software code that a developer or engineer has built to debug existing version of the autonomous driving software operating in the in-vehicle control computer. The result of the processing the known scenario with the additional offline algorithm can provide a second set of data that describes simulated autonomous driving operations in response to the known scenario. The second set of data may also include status information of the various aspects of the autonomous vehicle as the autonomous vehicle is simulated through the known scenario. The offline algorithms may have been corrected through intervention by a human operator, as is described in the present document.

The confidence checker module at operation 706 can compare the first set of data with the second set of data to evaluate how the two versions of the autonomous driving software operate in the same scenario. In some embodiments, the confidence checker module can use techniques such as null hypothesis statistical testing to compare the two sets of data. The confidence checker module can determine one or more metrics that quantify the difference between the two sets of data. If the confidence checker module determines that one or more determined metrics is greater than one or more known thresholds, then the confidence checker module can determine that the difference between the two sets is significant and both sets of data are sent as contradictory results 708 to a hard case dataset 710 database in the computer (e.g., shown as 830 in FIG. 8).

The auto-correction module (e.g., shown as 835 in FIG. 8) can perform auto-correction operation 712 by determining changes to the existing autonomous driving software to improve the existing autonomous driving software. In some embodiments, the changes may include determining the updates to formula(s) (or equation(s)) and/or machine learning model(s) in the existing autonomous driving software that may need to be changed to have the existing autonomous driving software yield the second set of data to the known scenario. In some embodiments, changes may include updates to the machine learning model used by the existing autonomous driving software or updates to image processing techniques to better identify moving objects (e.g., other cars, pedestrians) or static obstacles (e.g., speed bumps, stop signs, etc.) located in an area surrounding the autonomous vehicle.

The human annotation module (e.g., shown as 840 in FIG. 8) can perform the human annotation operation 714 by sending to a computer monitor the first set of data, the second set of data, the existing autonomous driving software and the additional offline algorithm so that a developer or an engineer can debug or revise the existing autonomous driving software. The formula(s) and/or machine learning model(s) of the revised autonomous driving software obtained from either operation 712 or 714 can be sent to the structure dataset database included in the computer (e.g., shown as 845 in FIG. 8). In some embodiments, the human annotation module may send to a computer monitor an image for which a semantic segmentation process yielded one or more regions, where the in-vehicle control computer could not determine the identity of the one or more regions. In such embodiments, a person can assign identities for the one or more regions that the in-vehicle control computer could not identify.

Returning to operation 706, if the results of the first and second sets of data are determined to be coherent by the confidence checker module, then the coherent results output are sent to the structure dataset 716. The confidence checker module may determine that the first set of data and second set of data are coherent if one or more metrics that describes the difference between the two sets of data are less than one or more known thresholds. The coherent results output may include value(s), variable(s), formula(s), and/or machine learning model(s) of the existing autonomous driving software.

The value(s), variable(s), and/or formula(s) included in the structure dataset 716 may be used to analyze new tasks and dataset 718 or to perform simulation 720 or to set conditional benchmarks 724. Operations 718-724 may be performed by a data processing module of the computer (e.g., shown as 850 in FIG. 8). As an example, the data processing module can perform simulation 720 using images or point cloud data of the known scenario based on the value(s), variable(s), and/or formula(s) stored in the structured dataset 716. In embodiments where the structured dataset 716 includes new value(s), variable(s), and/or formula(s) for a revised or debugged autonomous driving software version, the simulation 720 can be performed on the new value(s), variable(s), and/or formula(s) to assess performance of the revised or debugged autonomous driving software version. For example, the simulations may be used to perform software regression testing.

The data processing module can perform conditional benchmarks 724 using the value(s), variable(s), and/or formula(s) stored in the structured dataset 716 for the first set of data (for the existing autonomous driving software) or for the second set of data (for the revised autonomous driving software). In some embodiments, conditional benchmark may be performed by simulating operations of a version of autonomous driving software with camera images and/or LiDAR point cloud data that are previously recorded and stored. The conditional benchmark operation can calculate one or more metrics that characterizes the overall performance of the autonomous driving software. The data processing module can automatically update a model 726 if the data processing module determines that one or more metrics of the conditional benchmark operation 724 exceed pre-determined threshold(s). A model may include, for example, a revised autonomous driving software or a machine learning model that can be updated by the data processing module.

Figure 8:
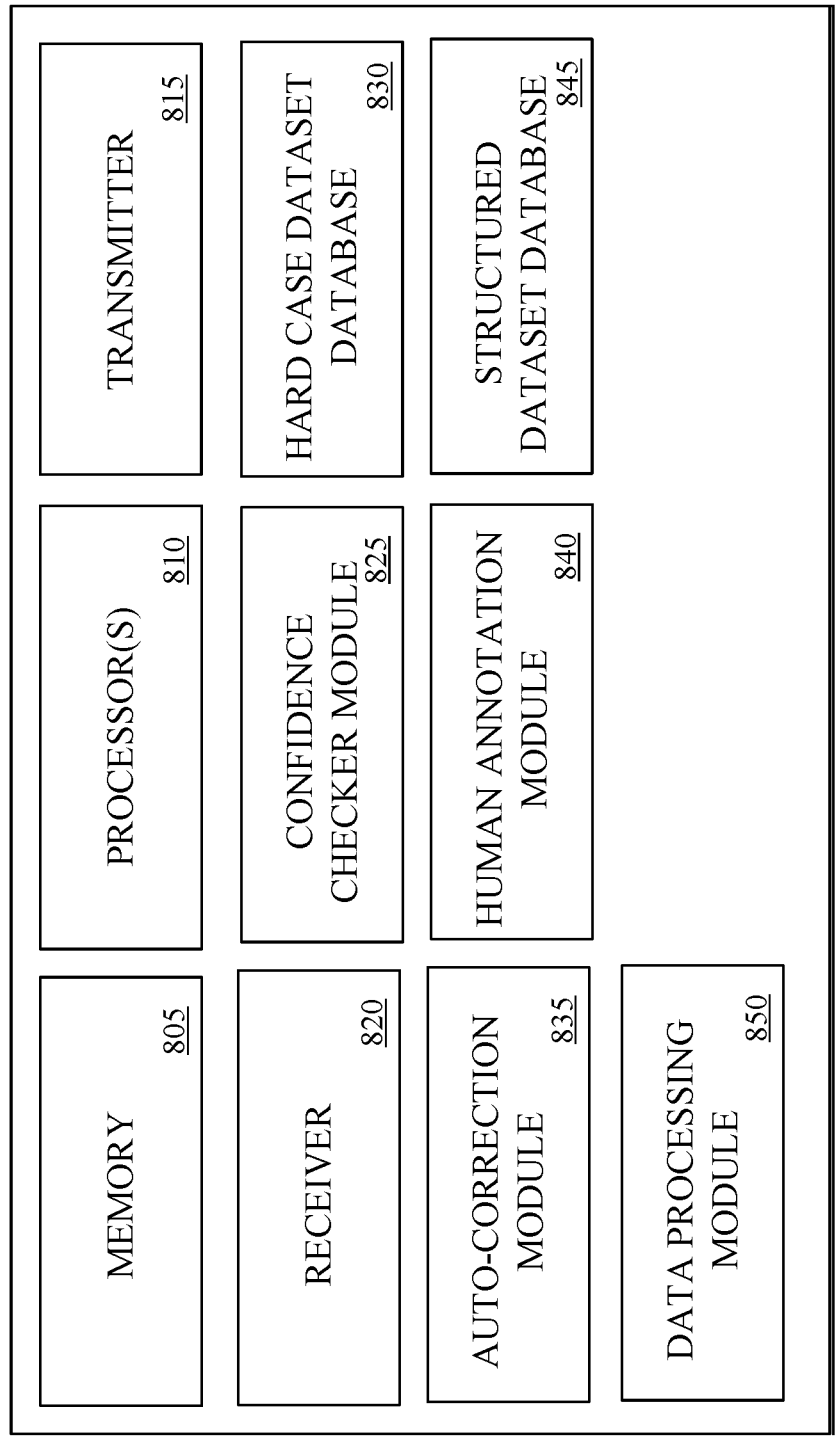
FIG. 8 shows an exemplary block diagram of a computer system for operating an autonomous vehicle.

FIG. 8 shows an exemplary block diagram of a computer that improves software that operates in an autonomous vehicle. The computer 800 includes at least one processor 810 and a memory 805 having instructions stored thereupon. The instructions upon execution by the processor 810 configure the computer 800 and/or the various modules of the computer 800 to perform the operations described in FIGS. 6-7 and in the various embodiments described in this patent document. The transmitter 815 and receiver 820 may send and receive information, respectively.

It will be appreciated that the present document describes various techniques that can be used by autonomous vehicles for navigating the vehicle through areas that are difficult to maneuver. In one example aspect, the computation task of evaluating various vehicle path options and selecting an option for navigating the vehicle is divided into two computational platforms-one platform operates in an offline environment that is located outside and remotely from the autonomous vehicle, e.g., in a computing cloud and another platform that is located on the autonomous vehicle. The offline server may pre-perform the task of evaluating various navigational paths and provide a library of path options to the online server. The entire navigational task when maneuvering the autonomous vehicle in tight areas may be discretized into smaller path increments along grid points and the online server may make decisions regarding going from one grid point to a next grid point based on the path library. The task of selecting a next path poses significantly less computation burden than evaluating optimality of various path options, thereby enabling real time vehicle navigation without burdening on-board resources.

Implementations of the subject matter and the functional operations described in this patent document can be implemented in various systems, semiconductor devices, optical devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of navigating an autonomous vehicle, comprising:
    determining, by an online server located on the autonomous vehicle, current driving information including a current position in a geographic area where the autonomous vehicle is navigating;
    using the current driving information to determine an optimal path for navigating the autonomous vehicle between the current position and a next position based on possible paths from a pre-stored path library, wherein the pre-stored path library comprises a grid map that represented the geographic area, the grid map comprising a grid node map and an orientation grid bin map, the grid node map comprising position information of grid nodes along a driving trajectory, and the orientation grid bin map comprising information of heading angle resolution of the driving trajectory at respective grid nodes; and
    navigating the autonomous vehicle towards the next position based on the optimal path.

2. The method of claim 1, wherein using the current driving information to determine the optimal path for navigating the autonomous vehicle between the current position and the next position based on the possible paths from the pre-stored path library comprises:
    determining, a grid node matching the current position and a grid bin associated with the grid node based on a current heading angle of the autonomous vehicle on the grid map in the pre-stored path library;
    retrieving, from the pre-stored path library, the possible paths to a next grid node corresponding to the next position and a next grid bin based on the grid node and the grid bin; and
    determining, from the possible paths, the optimal path between the current position and the next position.

3. The method of claim 2, wherein navigating the autonomous vehicle towards the next position based on the optimal path comprises:
    generating, based on the optimal path between the current position and the next position, a steering command to navigate the autonomous vehicle.

4. The method of claim 3, wherein the steering command comprises at least one of a vehicle front wheel steering angle command, a vehicle steering handwheel angle command, a steering torque command, or a command to activate or deactivate a turn signal.

5. The system of claim 2, wherein
    the autonomous vehicle includes a tractor-trailer; and
    the optimal path is determined based on a performance metric relating to an angle between the tractor and the trailer.

6. The method of claim 1, wherein the pre-stored path library comprises a database of possible paths that is computed based on an offline path library generation process.

7. The method of claim 1, wherein the pre-stored path library is stored in a compressed format such that the online server performs data expansion for receiving the possible paths.

8. The method of claim 1, wherein the online server iteratively generates multiple steering commands to navigate the autonomous vehicle between multiple current positions and multiple next positions based on multiple optimal paths retrieved from the pre-stored path library such that a next position of a previous iteration is used as a current position of a next iteration until an end criterion is met by the autonomous vehicle.

9. A system for navigating an autonomous vehicle, comprising:
    a storage device on the autonomous vehicle for storing a library of optimal paths for navigating a geographic area, wherein the geographic area is represented as a grid map in the library, the grid map comprising a grid node map and an orientation grid bin map, the grid node map comprising position information of grid nodes along a driving trajectory, and the orientation grid bin map comprising information of heading angle resolution of the driving trajectory at respective grid nodes, and wherein the optimal paths in the library correspond to paths between grid node pairs in the grid map based on an optimization criterion; and
    an online server located on the autonomous vehicle configured to access the grid map from the library from the storage device based on a current position and a current heading angle of the autonomous vehicle, and navigate the autonomous vehicle between the current position and a next position in the geographic area based on the information.

10. The system of claim 9, wherein a grid density of grid nodes in the grid node map is non-uniform.

11. The system of claim 9, wherein the optimal paths of the library are stored in an analytical solution form of paths between grid node pairs in the grid map and node linkage information.

12. The system of claim 9, further comprising an offline server configured to generate the library.

13. The system of claim 12, wherein the offline server is located external to the autonomous vehicle and is configured to communicate with the storage device via a wireless communication channel.

14. The system of claim 12, wherein the offline server generates the library of optimal path using a method that includes:
    discretizing a position space into a grid node map defined by lateral and longitudinal location nodes along a reference driving line on a driving map;

discretizing an orientation space of each grid node in the grid node map into a grid bin array that defines a heading angle resolution of a driving trajectory;

performing a search for an optimal vehicle driving trajectory for the discretized position space, wherein the search includes vehicle state vectors, wherein the search includes evaluating driving trajectory connections between every two pairs of grid nodes on two layers along a reference driving direction to determine a driving action leading to global optimal complete trajectories; and determining, based on an evaluation, optimal paths for storage in the library.

15. The system of claim 9, wherein the autonomous vehicle is an articulated vehicle.

16. The system of claim 9, wherein the library comprises path information for the geographic area prior to the autonomous vehicle entering the geographic area.

17. The system of claim 9, further comprising a localization system configured to provide the current position of the autonomous vehicle.

18. The system of claim 9, further comprising a yaw angle measurement device configured to determine the current heading angle of the autonomous vehicle.

19. The system of claim 9, wherein accessing information from the library of optimal paths from the storage device based on the current position and the current heading angle of the autonomous vehicle comprises:

determining, a grid node matching the current position and a grid bin associated with the grid node based on the current heading angle of the autonomous vehicle on the grid map;

retrieving, from the library, possible paths to a next grid node corresponding to the next position and a next grid bin based on the grid node and the grid bin; and determining, from the possible paths, an optimal path between the current position and the next position.

20. The system of claim 19, wherein navigating the autonomous vehicle between the current position and the next position in the geographic area based on the information comprises:

generating, based on the optimal path between the current position and the next position, a steering command to navigate the autonomous vehicle.

\* \* \* \* \*